(12) United States Patent
Hagimori et al.

(10) Patent No.: US 6,930,839 B2
(45) Date of Patent: Aug. 16, 2005

(54) ZOOM LENS DEVICE

(75) Inventors: Hitoshi Hagimori, Ikoma-Gun (JP); Genta Yagyu, Amagasaki (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/651,005

(22) Filed: Aug. 28, 2003

(65) Prior Publication Data

US 2004/0189834 A1 Sep. 30, 2004

(30) Foreign Application Priority Data

Mar. 31, 2003 (JP) ........................................ 2003-093530

(51) Int. Cl.$^7$ ............................................. G02B 15/14
(52) U.S. Cl. ........................ 359/684; 359/686; 359/689
(58) Field of Search ................................ 359/689, 676, 359/683, 686

(56) References Cited

U.S. PATENT DOCUMENTS

| | | | |
|---|---|---|---|
| 4,999,007 A | | 3/1991 | Aoki et al. ................. 350/426 |
| 5,005,955 A | * | 4/1991 | Ohshita ....................... 359/676 |
| 5,157,550 A | * | 10/1992 | Tsuchida et al. ........... 359/686 |
| 5,220,458 A | * | 6/1993 | Ohshita ....................... 359/689 |
| 5,483,380 A | * | 1/1996 | Nozawa ...................... 359/686 |
| 5,537,254 A | * | 7/1996 | Ruben ......................... 359/682 |
| 5,745,301 A | | 4/1998 | Betensky et al. ........... 359/689 |
| 5,999,329 A | | 12/1999 | Ohtake ........................ 359/686 |
| 6,088,169 A | | 7/2000 | Ohno ........................... 359/682 |
| 6,349,002 B1 | | 2/2002 | Shibayama et al. ......... 359/689 |
| 6,452,729 B2 | | 9/2002 | Yamamoto ................... 359/676 |
| 6,522,476 B2 | | 2/2003 | Koreeda ...................... 359/681 |
| 6,538,824 B1 | | 3/2003 | Mihara et al. ............... 359/684 |
| 6,545,819 B1 | | 4/2003 | Nanba et al. ................ 359/689 |
| 2002/0024746 A1 | * | 2/2002 | Hagimori ..................... 359/691 |

FOREIGN PATENT DOCUMENTS

| | | |
|---|---|---|
| JP | 06-094996 A | 4/1994 |
| JP | 2001-033701 A | 2/2001 |
| JP | 2001-242378 A | 9/2001 |
| JP | 2001-281547 A | 10/2001 |
| JP | 2001-343584 A | 12/2001 |
| JP | 2002-0142184 A | 1/2002 |
| JP | 2002-196238 A | 7/2002 |
| JP | 2002-196240 A | 7/2002 |
| JP | 2002-244043 A | 8/2002 |
| JP | 2002-341245 A | 11/2002 |
| JP | 2002-350726 A | 12/2002 |

* cited by examiner

Primary Examiner—Scott J. Sugarman
(74) Attorney, Agent, or Firm—Sidley Austin Brown & Wood LLP

(57) ABSTRACT

A zoom lens device has a zoom lens system having a plurality of lens units; and an image sensor converting an optical image formed by the zoom lens system, into electric image data. The zoom lens system has a first lens unit disposed on the most object side and consisting of a single negative lens element, a second lens unit having a positive optical power; and a diaphragm disposed on the object or the image side of the second lens unit, or in the second lens unit. Zooming is performed by varying the distances between the lens units. Focus adjustment by varying the object distance is performed by moving along the optical axis a positive lens unit or a single lens element disposed in a position on the image side of the diaphragm and not included in the most image side lens unit.

19 Claims, 16 Drawing Sheets

ZOOM LENS DEVICE

RELATED APPLICATION

This application is based on application No. 2003-93530 filed in Japan, the content of which is hereby incorporated by reference.

1. Field of the Invention

The present invention relates to a zoom lens device having an image sensor that converts, into electric signals, optical images formed on the light receiving surface of a charge coupled device (CCD), a complementary metal-oxide semiconductor (CMOS) sensor or the like, and more particularly, to a compact zoom lens device having a zoom lens system.

2. Description of the Prior Art

In recent years, digital cameras have become prevalent that convert optical images into electronic signals by using an image sensor such as a CCD or a CMOS sensor instead of silver halide film, convert the data to digital form, and record or transfer the digitized data. In such digital cameras, since CCDs and CMOS sensors having high pixels such as two million pixels and three million pixels are comparatively inexpensively provided recently, high-performance zoom lens devices mounted with a high-pixel image sensor are in greatly increasing demand. Of these zoom lens devices, compact zoom lens devices are particularly desired that are provided with a zoom lens system capable of performing zooming without any image quality degradation.

Further, in recent years, zoom lens devices have been becoming incorporated in or externally attached to personal computers, mobile computers, mobile telephones, personal digital assistances (PDAs) and the like because of improvements in the image processing capability of semiconductor elements and the like, which spurs the demand for high-performance zoom lens devices.

As zoom lens systems used for such zoom lens devices, so-called minus lead zoom lens systems in which the lens unit disposed on the most object side has a negative optical power are proposed in large numbers. Minus lead zoom lens systems have features such that they are easily made wide-angle and that the lens back focal length necessary for inserting an optical low-pass filter is easily secured.

Conventional examples of minus lead zoom lens systems include zoom lens systems proposed as taking lens systems for film-based cameras. However, in these zoom lens systems, since the exit pupil of the lens system is situated comparatively near the image plane in the shortest focal length condition, it does not match with the pupil of the microlens provided so as to correspond to each pixel of the image sensor having high pixels, so that a sufficient quantity of peripheral light cannot be secured. In addition, since the position of the exit pupil largely varies during zooming, the setting of the pupil of the microlens is difficult. Further, since required optical performance such as spatial frequency characteristics is completely different between silver halide film and image sensors, optical performance required of image sensors cannot be sufficiently secured. For these reasons, there has emerged a need for the development of a dedicated zoom lens system optimized for zoom lens devices having an image sensor.

As a minus lead zoom lens system for zoom lens devices having an image sensor, for example, U.S. Pat. No. 5,745,301 discloses a two-unit zoom lens system comprising a first lens unit having a negative optical power and a second lens unit having a positive optical power.

Moreover, U.S. Pat. No. 4,999,007 discloses a three-unit zoom lens system for video cameras comprising a first lens unit having a negative optical power, a second lens unit having a positive optical power and a third lens unit having a positive optical power.

The above-mentioned U.S. Pat. No. 4,999,007 also discloses a four-unit zoom lens system for video cameras comprising a first lens unit having a negative optical power, a second lens unit having a positive optical power, a third lens unit having a negative optical power and a fourth lens unit having a positive optical power.

Further, U.S. Pat. No. 5,999,329 discloses a four-unit zoom lens system for electronic still cameras comprising a first lens unit having a negative optical power, a second lens unit having a positive optical power, a third lens unit having a negative optical power and a fourth lens unit having a positive optical power.

However, the zoom lens systems disclosed in U.S. Pat. No. 5,745,301 and U.S. Pat. No. 4,999,007 where the zoom ratio is approximately 2× are low in zoom ratio.

Moreover, in the zoom lens system disclosed in U.S. Pat. No. 5,999,329, although the zoom ratio is approximately 3×, the f-number in the longest focal length condition is as high as 7. Thus, this is not a bright zoom lens system.

Further, these zoom lens systems all require a great number of lens elements, and therefore lack in compactness, particularly compactness in the direction of the optical system when housed (collapsed). Further, none of these prior art documents refer to focus adjustment.

SUMMARY OF THE INVENTION

An object of the present invention is to provide a zoom lens device having a zoom lens system that is capable of efficient focus adjustment and whose length in the direction of the optical axis when the lens system is housed is sufficiently short although the zoom ratio is high.

Another object of the present invention is to provide a zoom lens device having a zoom lens system that is capable of efficient focus adjustment and is bright even in the longest focal length condition and whose length in the direction of the optical axis when the lens system is housed is sufficiently short.

To attain the above-mentioned objects, a zoom lens device of the present invention comprises from the object side: a zoom lens system; and an image sensor converting an optical image formed by the zoom lens system, into electric image data. The zoom lens system comprises a plurality of lens units including a first lens unit disposed on the most object side and including only one negative lens element. Zooming is performed by varying the distances between the lens units. The diaphragm is disposed on the object or the image side of the second lens unit, or in the second lens unit, and focus adjustment by varying the object distance is performed by moving along the optical axis a positive lens unit or a single lens element disposed in a position on the image side of the diaphragm and not included in the most image side lens unit.

Another aspect of the present invention is a digital camera including the above-described zoom lens device. While the term digital camera conventionally denotes cameras that record only optical still images, cameras that can handle moving images as well and home digital video cameras have also been proposed and at present, there is no distinction between cameras that record only still images and cameras that can handle moving images as well. Therefore, the term digital camera used in this specification includes all of the cameras such as digital still cameras, digital movie cameras and web cameras (cameras connected to apparatuses enabling image transmission and reception by being connected to a network irrespective of whether it is an open type or a private one; including both of cameras directly connected to the network and cameras connected through an apparatus having an information processing function such as a personal computer) where an image forming device having an image sensor that converts optical images formed on the light receiving surface into electric signals is a principal element.

Moreover, another aspect of the present invention is a portable information apparatus including the above-described zoom lens device. Here, the portable information apparatus means a compact portable information apparatus terminal for private use such as a mobile telephone terminal and a PDA (personal digital assistant).

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
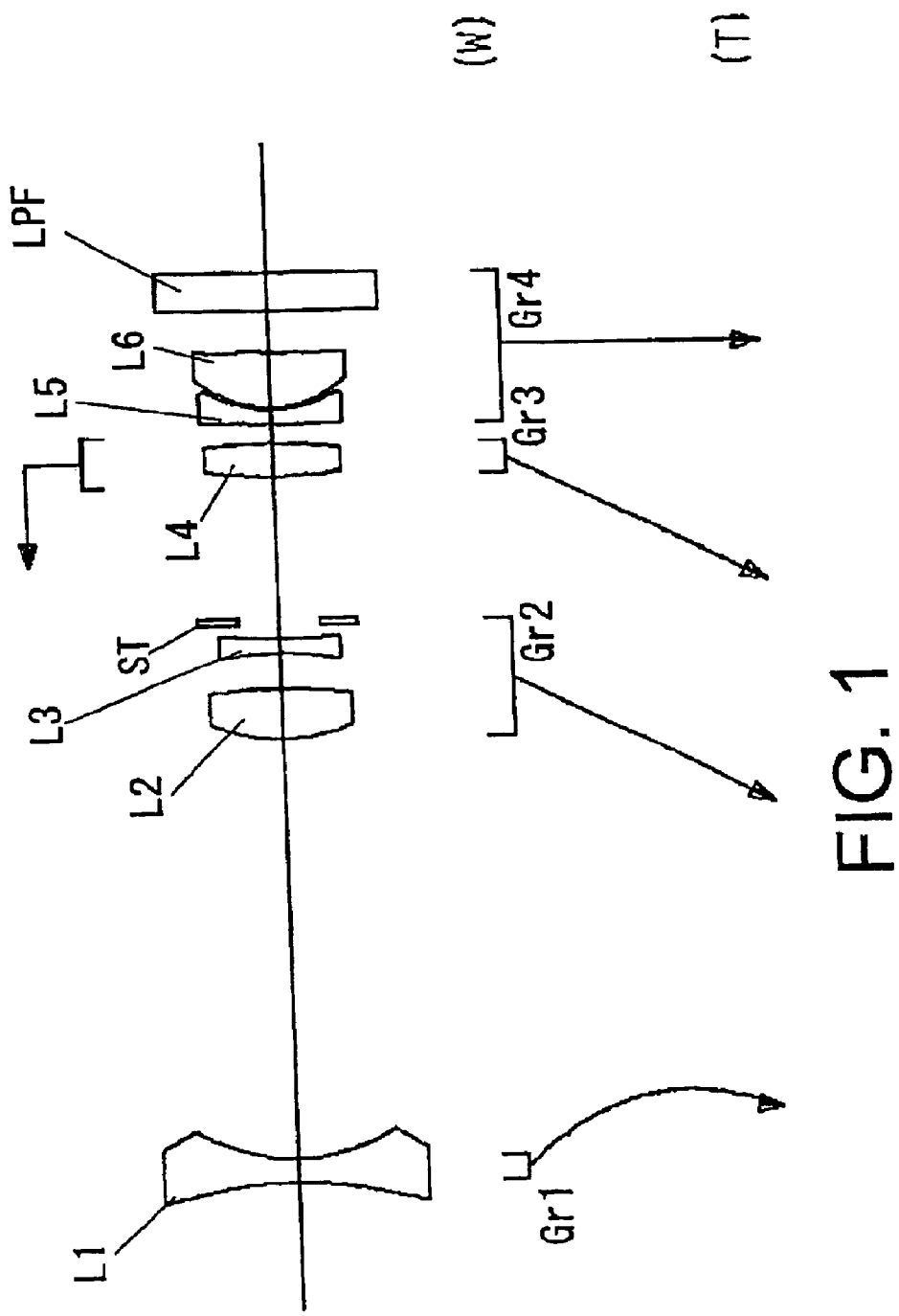
FIG. 1 is a lens construction view of a first embodiment (first example)

Referring to the drawings, an embodiment of the present invention will be described.

Figure 16:
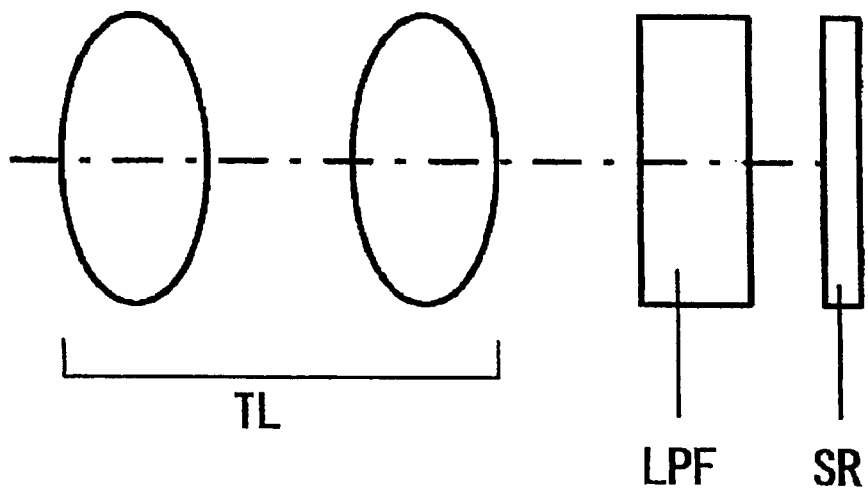
FIG. 16 is a construction view showing the present invention in outline.

An image forming device according to the embodiment of the present invention comprises, for example as shown in FIG. 16, from the object side (subject side): a zoom lens system TL forming an optical image of an object so as to be zoomable; an optical low-pass filter LPF; and an image sensor SR converting the optical image formed by the zoom lens system TL into electric signals. The image forming device is a principal element of cameras incorporated in or externally attached to digital cameras, video cameras, personal computers, mobile computers, mobile telephones, PDAs and the like.

The optical low-pass filter LPF has a specific cutoff frequency for adjusting the spatial frequency characteristics of the taking lens system to thereby eliminate the color moire generated in the image sensor. The optical low-pass filter of the embodiment is a birefringent low-pass filter formed by laminating a birefringent material such as crystal having its crystallographic axis adjusted in a predetermined direction, wave plates changing the plane of polarization, or the like. As the optical low-pass filter, a phase low-pass filter or the like may be adopted that attains necessary optical cutoff frequency characteristics by a diffraction effect.

The image sensor SR comprises a CCD having a plurality of pixels, and converts the optical image formed by the zoom lens system into electric signals by the CCD. The signals generated by the image sensor SR undergo predetermined digital image processing or image compression processing as required, and are recorded into a memory (a semiconductor memory, an optical disk, etc.) as digital video signals or in some cases, transferred to another apparatus through a cable or by being converted into infrared signals. A CMOS sensor may be used instead of a CCD.

FIG. 1 shows the lens arrangement of a zoom lens system of a first embodiment. This zoom lens system comprises from the object side: a first lens unit Gr1 including only a first lens element L1 of a bi-concave configuration; a second lens unit Gr2 including a second lens element of a bi-convex configuration, a third lens element L3 of a bi-concave configuration, a diaphragm ST and a fourth lens element L4 of a bi-convex configuration; and a third lens unit Gr3 including a fifth lens element L5 of a negative meniscus configuration convex to the object side and a sixth lens element L6 of a positive meniscus configuration convex to the object side. In zooming from the shortest focal length condition to the longest focal length condition, the first lens unit Gr1 moves so as to draw a locus of a U-turn convex to the image side, the second lens unit Gr2 monotonously moves toward the object side, and the third lens unit Gr3 is stationary with respect to the image surface. In focusing from the infinity in-focus state to the finite object in-focus state, the fourth lens element L4 alone is moved toward the object side.

Figure 2:
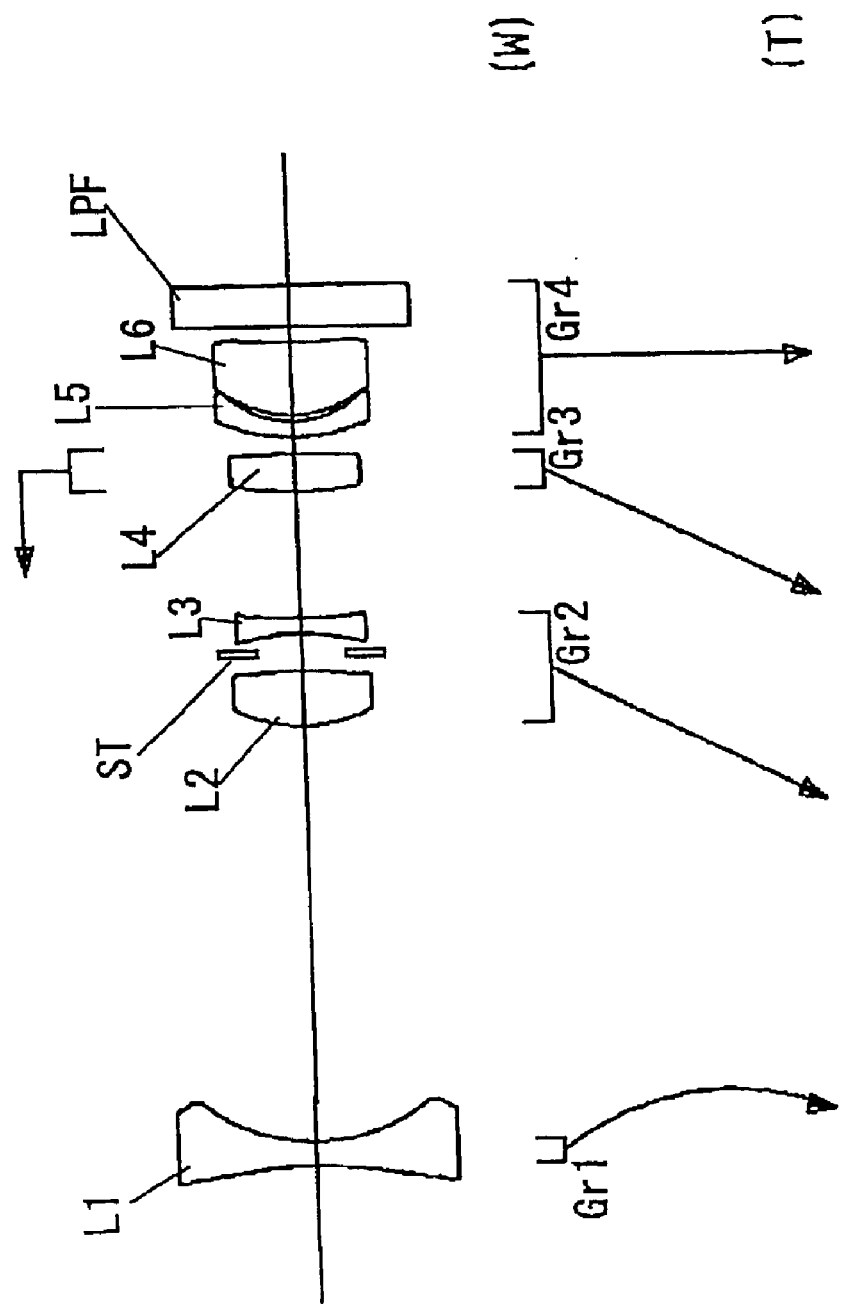
FIG. 2 is a lens construction view of a second embodiment (second example)

FIG. 2 shows the lens arrangement of a zoom lens system of a second embodiment. This zoom lens system comprises from the object side: a first lens unit Gr1 including only a first lens element L1 of a bi-concave configuration; a second lens unit Gr2 including a second lens element L2 of a bi-convex configuration, a diaphragm ST and a third lens element L3 of a paraxially bi-concave configuration; a third lens unit Gr3 including only a fourth lens element L4 of a bi-convex configuration; and a fourth lens unit Gr4 including a fifth lens element L5 of a negative meniscus configuration convex to the object side and a sixth lens element L6 of a positive meniscus configuration convex to the object side. In zooming from the shortest focal length condition to the longest focal length condition, the first lens unit Gr1 moves so as to draw a locus of a U-turn convex to the image side, the second lens unit Gr2 and the third lens unit Gr3 monotonously move toward the object side while slightly increasing the distance therebetween, and the fourth lens unit Gr4 is stationary with respect to the image surface. In focusing from the infinity in-focus state to the finite object in-focus state, the fourth lens element L4 alone is moved toward the object side.

Figure 3:
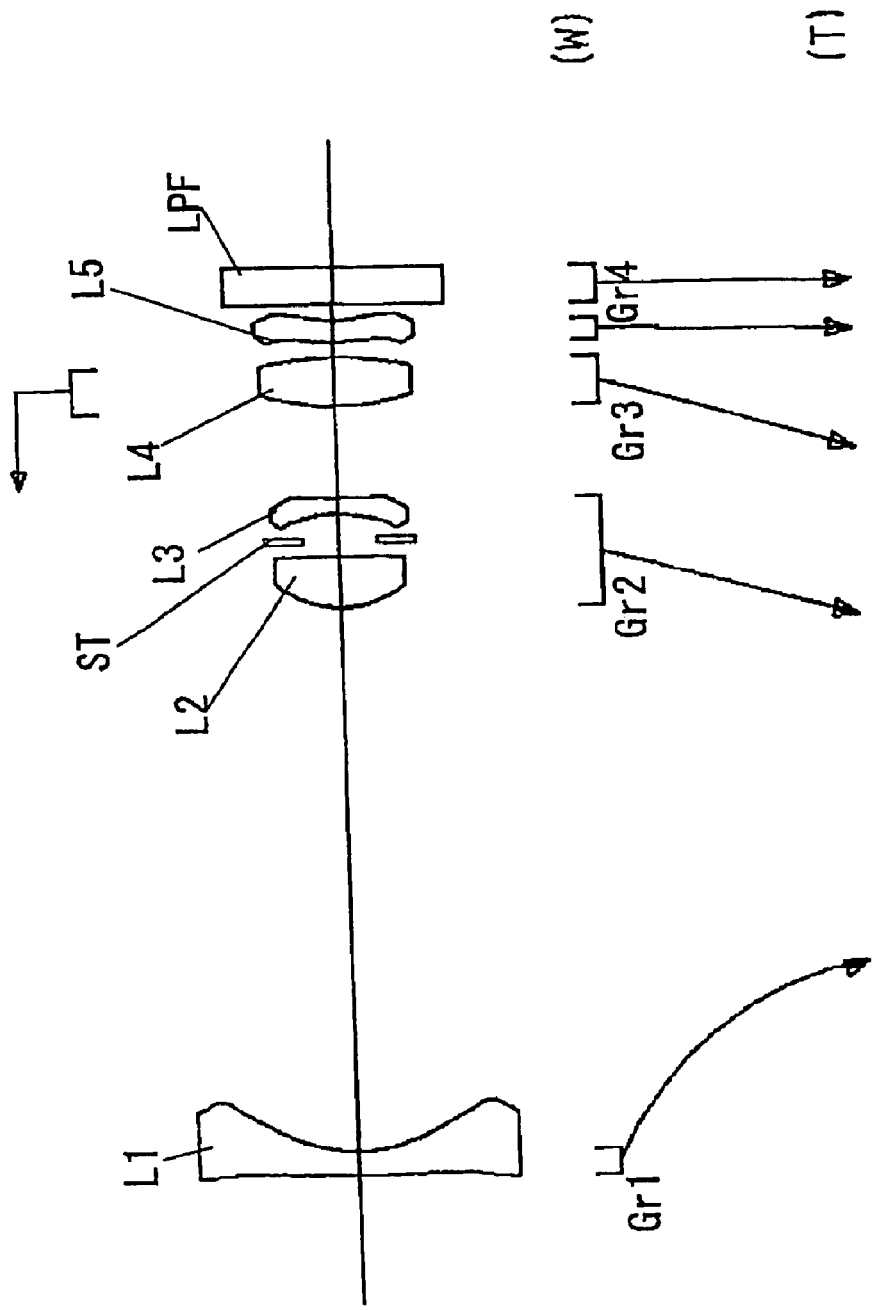
FIG. 3 is a lens construction view of a third embodiment (third example)

FIG. 3 shows the lens arrangement of a zoom lens system of a third embodiment. This zoom lens system comprises from the object side: a first lens unit Gr1 including only a first lens element L1 of a bi-concave configuration; a second lens unit Gr2 including a second lens element L2 of a substantially plano-convex configuration convex to the object side, a diaphragm ST and a third lens element L3 of a paraxially bi-concave configuration; a third lens unit Gr3 including only a fourth lens element L4 of a bi-convex configuration; and a fourth lens unit Gr4 including only a fifth lens element L5 of a paraxially positive meniscus configuration convex to the object side. In zooming from the shortest focal length condition to the longest focal length condition, the first lens unit Gr1 moves so as to draw a locus of a U-turn convex to the image side, the second lens unit Gr2 and the third lens unit Gr3 monotonously move toward the object side while slightly varying the distance therebetween, and the fourth lens unit Gr4 moves so as to draw a locus of a U-turn convex to the object side. In focusing from the infinity in-focus state to the finite object in-focus state, the fourth lens element L4 alone is moved toward the object side.

Figure 4:
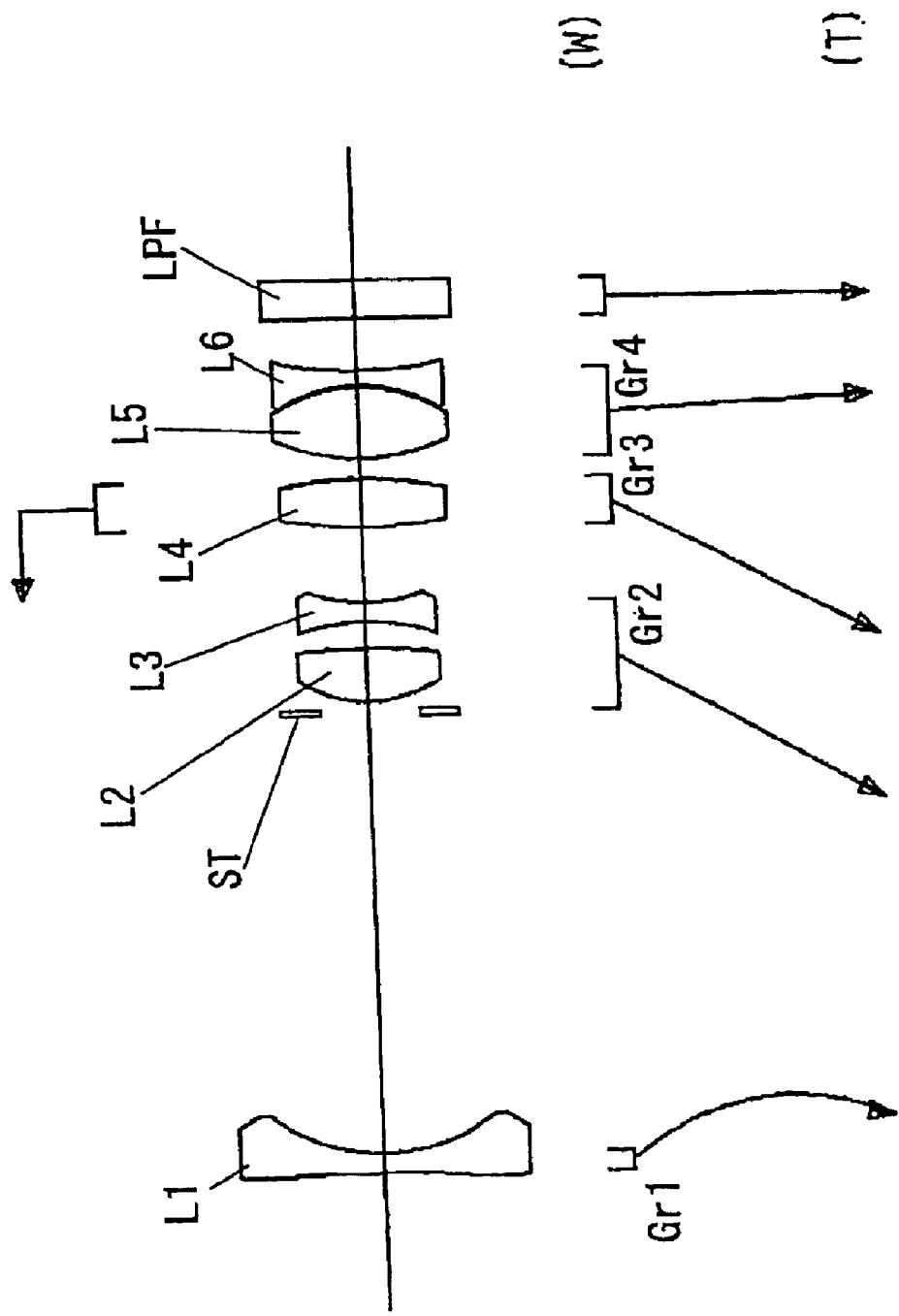
FIG. 4 is a lens construction view of a fourth embodiment (fourth example)

FIG. 4 shows the lens arrangement of a zoom lens system of a fourth embodiment. This zoom lens system comprises from the object side: a first lens unit Gr1 including only a first lens element L1 of a bi-concave configuration; a second lens unit Gr2 including a diaphragm ST, a second lens element L2 of a bi-convex configuration and a third lens element L3 of a bi-concave configuration; a third lens unit Gr3 including only a fourth lens element L4 of a bi-convex configuration; and a fourth lens unit Gr4 including a fifth lens element L5 of a bi-convex configuration and a sixth lens element L6 of a bi-concave configuration. In zooming from the shortest focal length condition to the longest focal length condition, the first lens unit Gr1 moves so as to draw a locus of a U-turn convex to the image side, the second lens unit Gr2 and the third lens unit Gr3 monotonously move toward the object side while slightly increasing the distance therebetween, and the fourth lens unit Gr4 moves so as to draw a locus convex to the object side. In focusing from the infinity in-focus state to the finite object in-focus state, the fourth lens element L4 alone is moved toward the object side.

Figure 5:
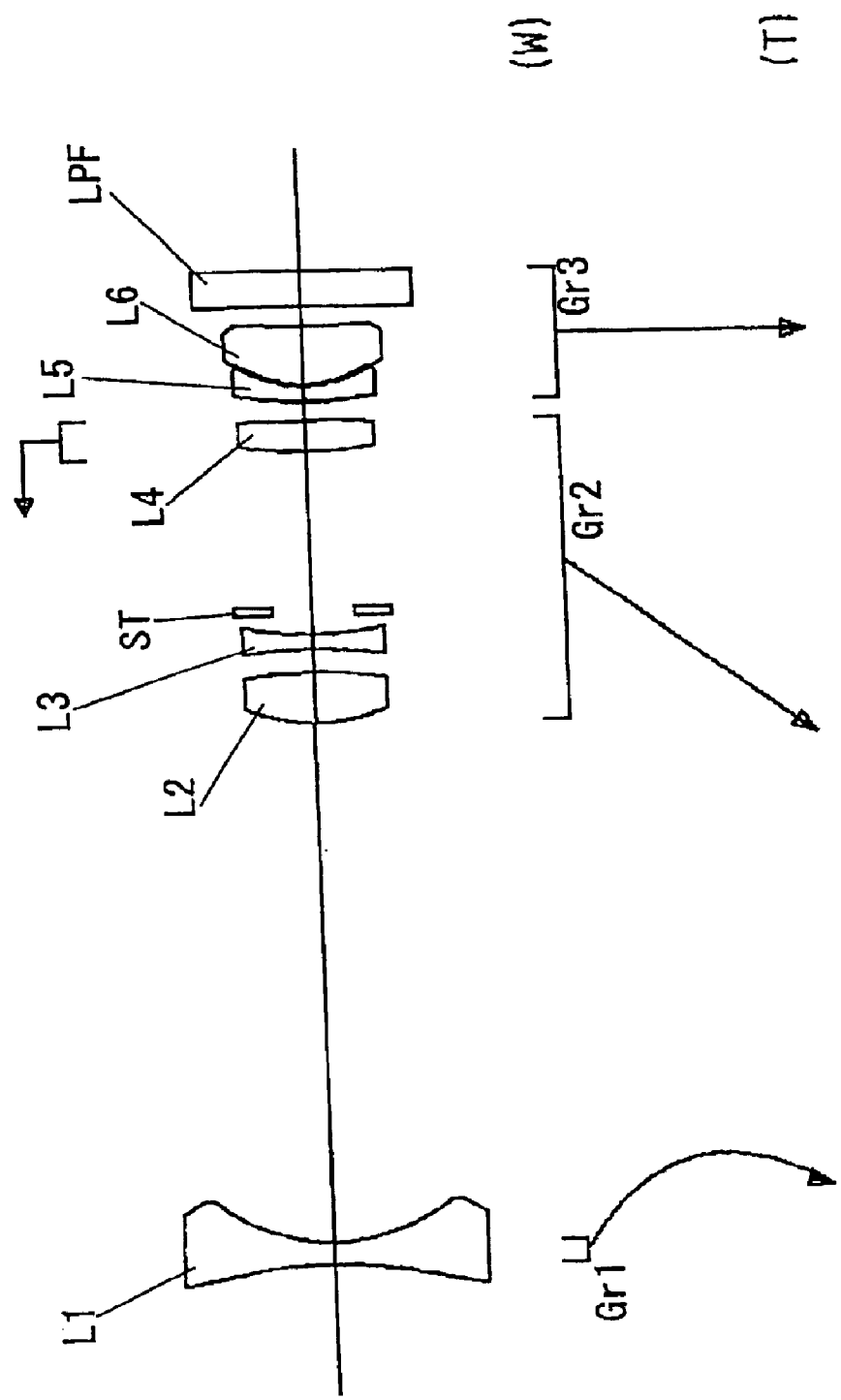
FIG. 5 is a lens construction view of a fifth embodiment (fifth example)
Figure 6:
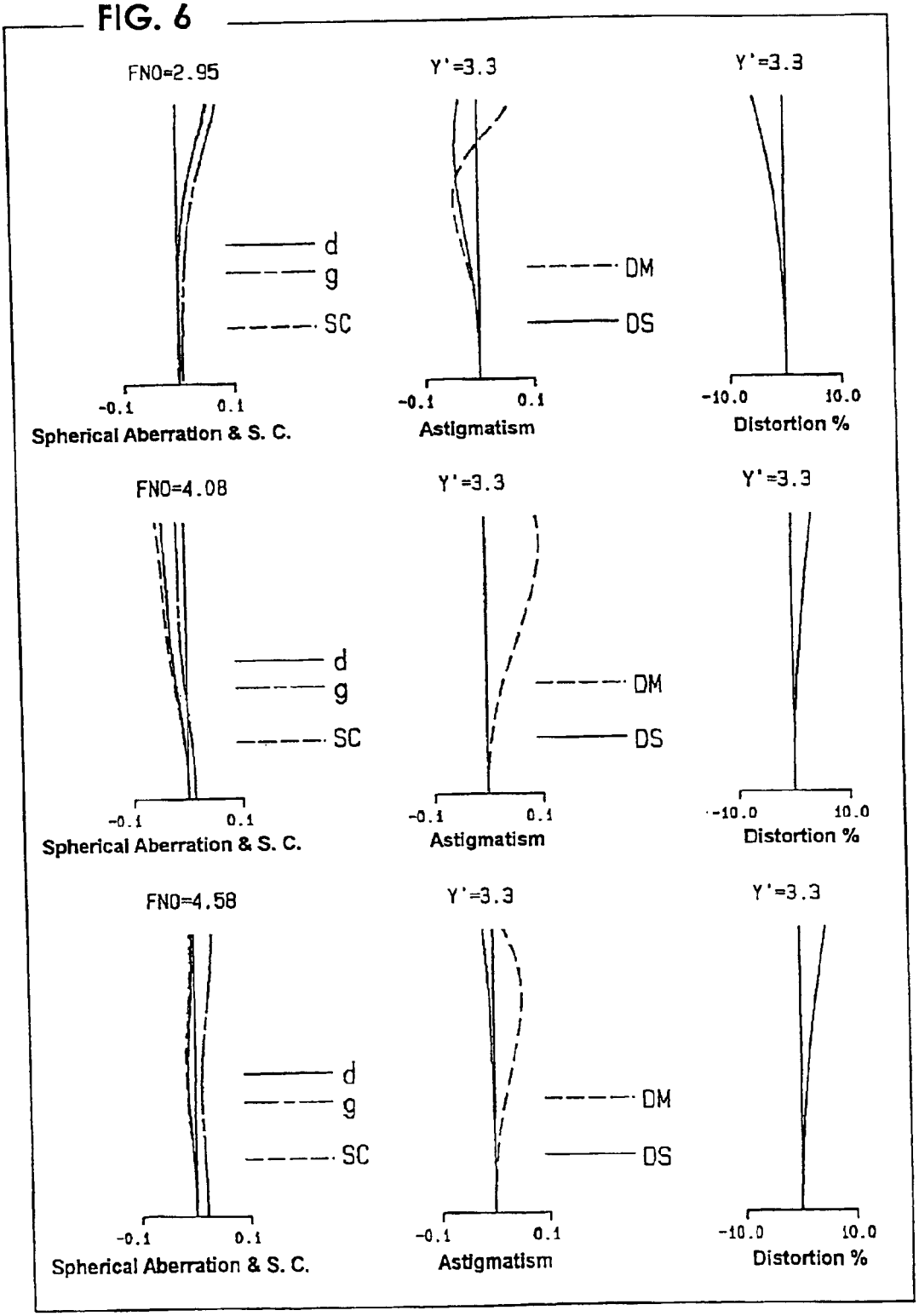
FIG. 6 is representations of aberrations of the first embodiment in in-focus state at infinity.
Figure 7:
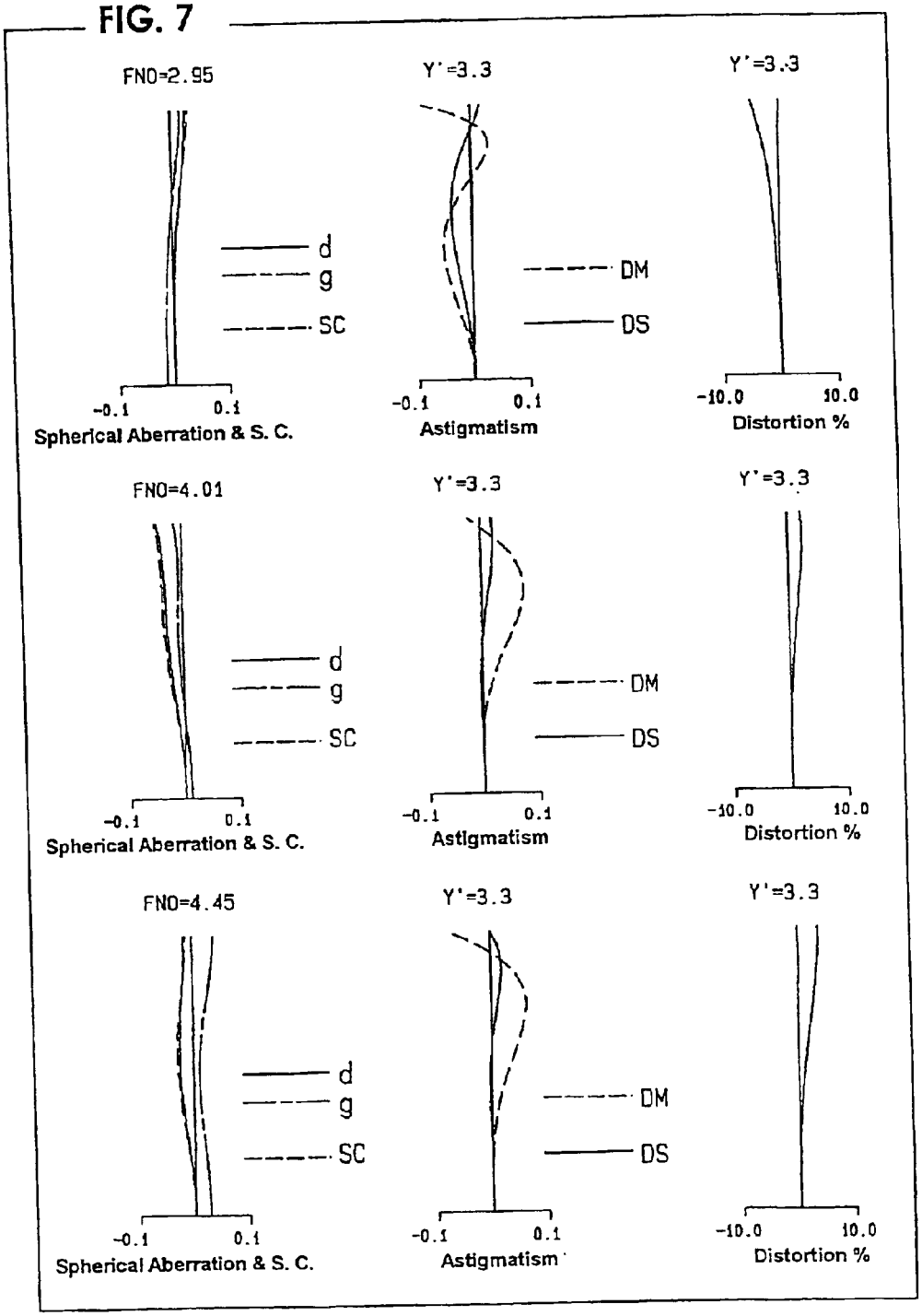
FIG. 7 is graphic representations of aberrations of the second embodiment in in-focus state at infinity.
Figure 8:
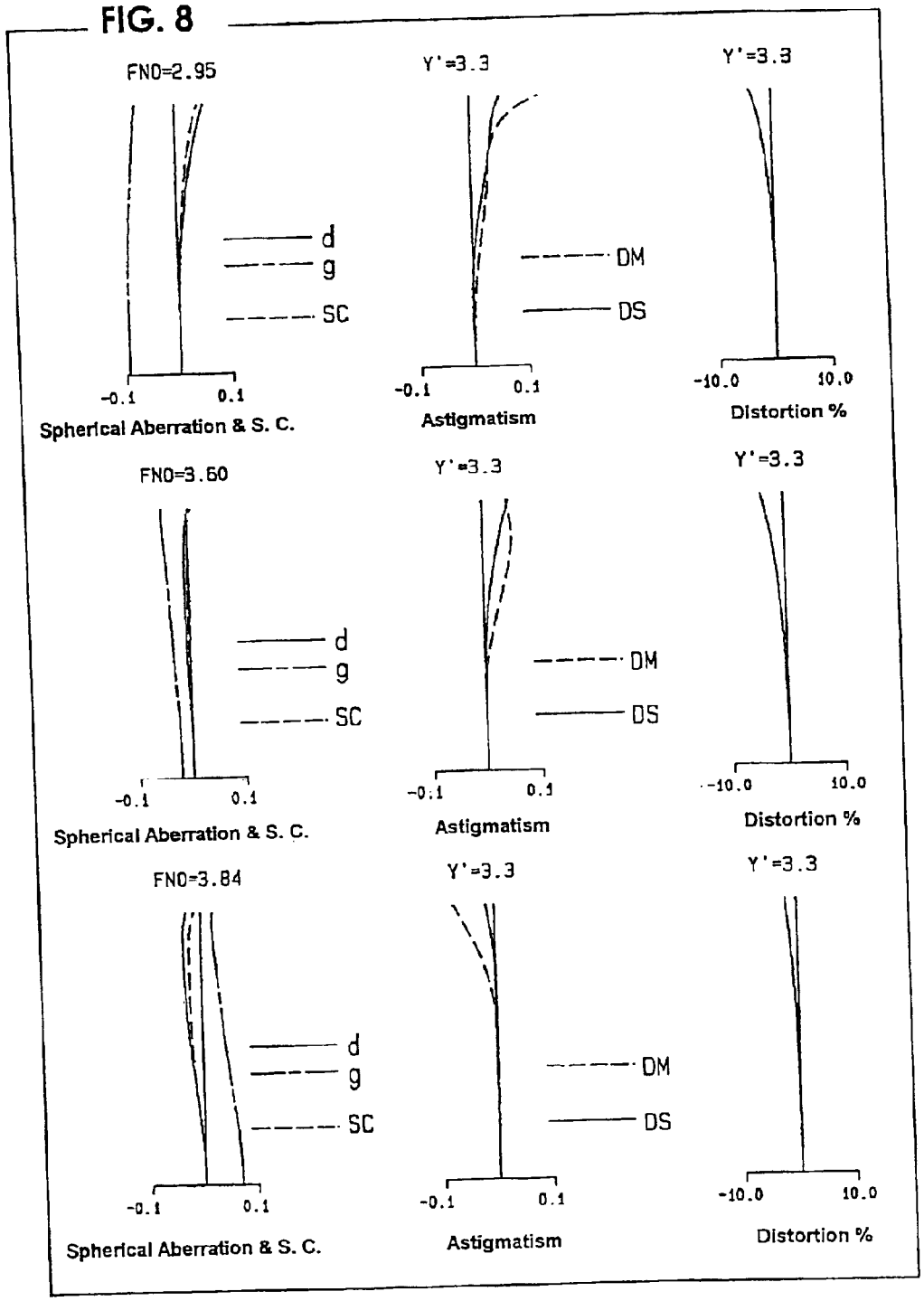
FIG. 8 is graphic representations of aberrations of the third embodiment in in-focus state at infinity.
Figure 9:
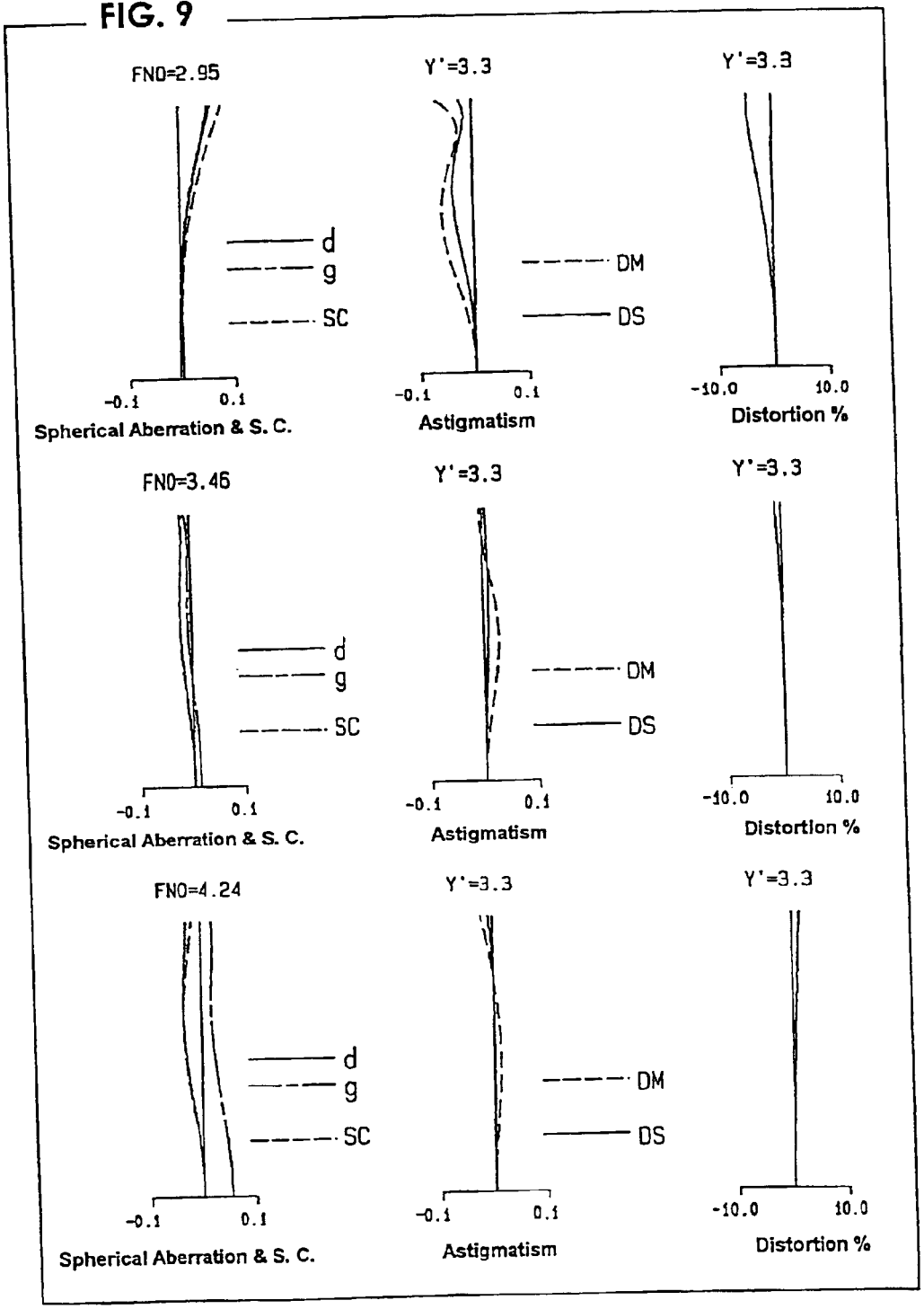
FIG. 9 is graphic representations of aberrations of the fourth embodiment in in-focus state at infinity.
Figure 10:
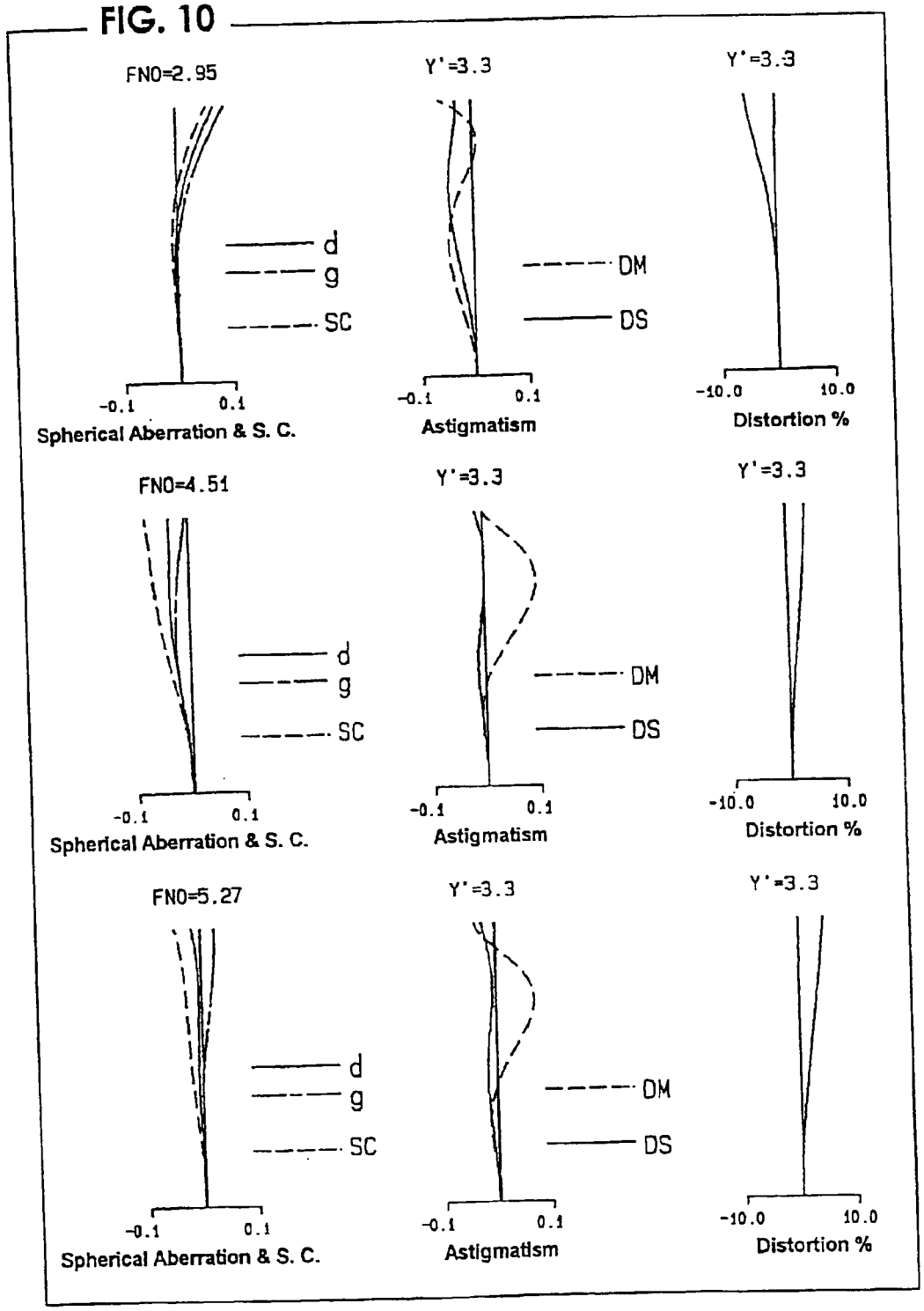
FIG. 10 is graphic representations of aberrations of the fifth embodiment in in-focus state at infinity.
Figure 11:
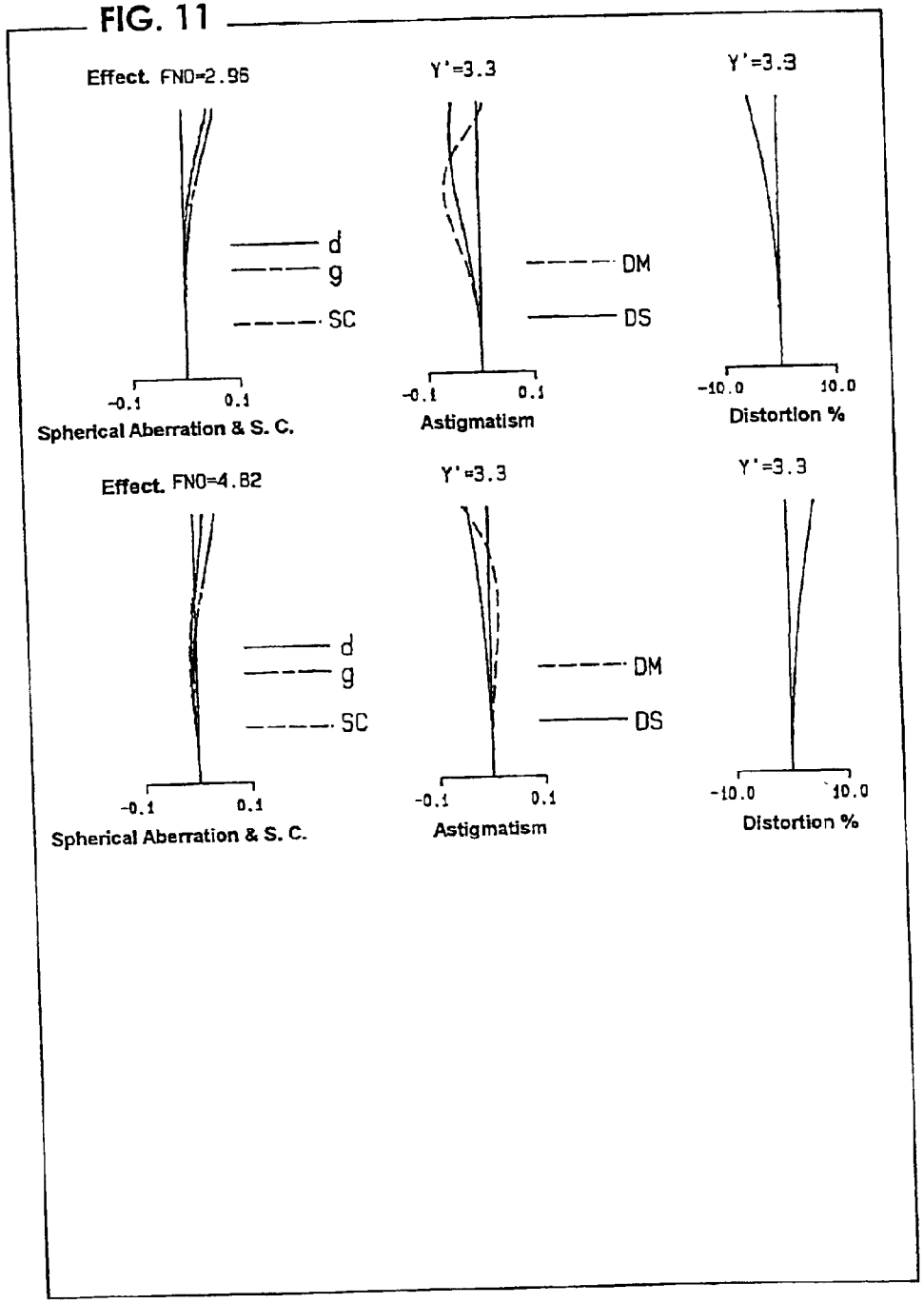
FIG. 11 graphic representations of aberrations of the first embodiment in in-focus state at finite distance.
Figure 12:
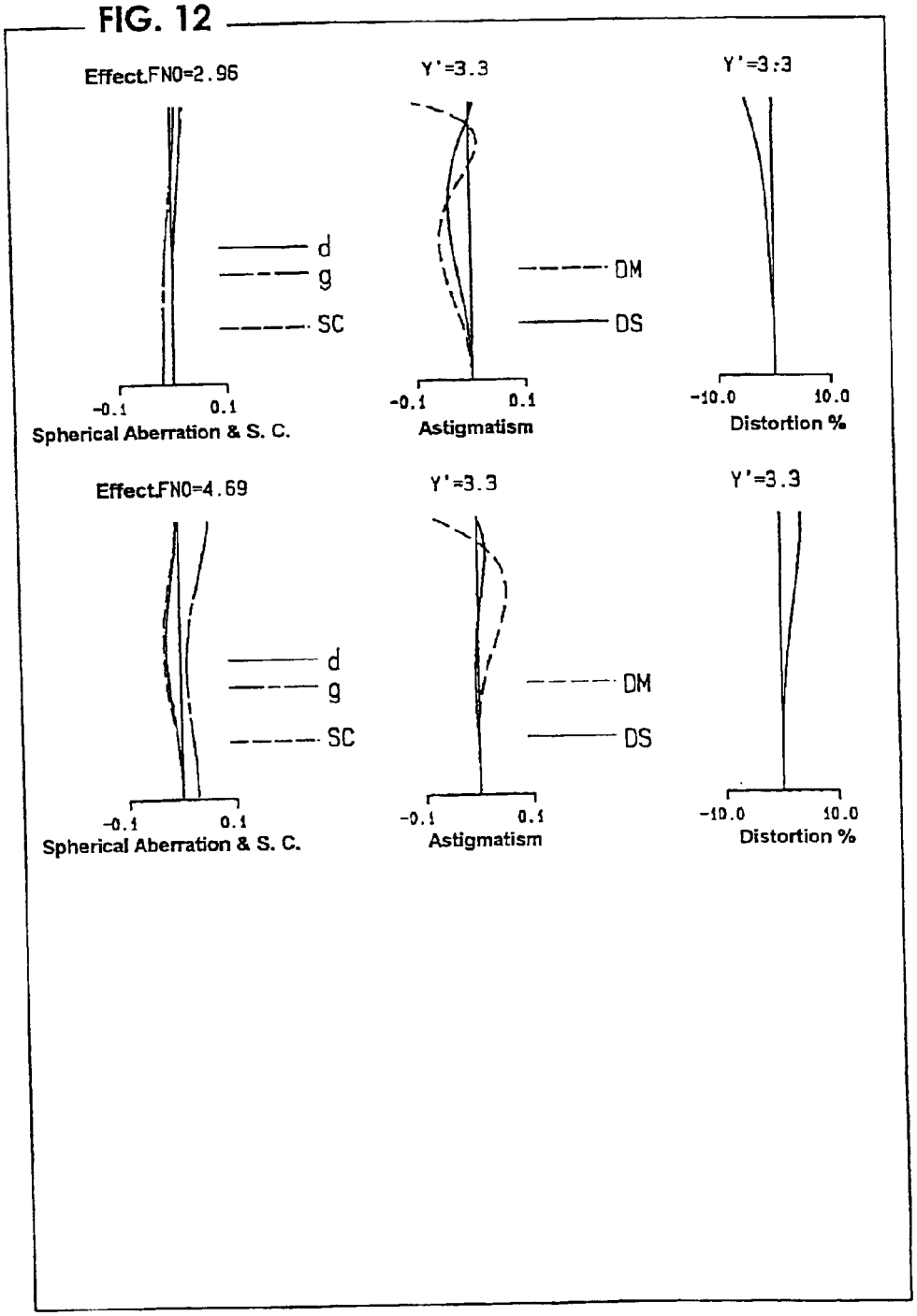
FIG. 12 is graphic representations of aberrations of the second embodiment in in-focus state at finite distance.
Figure 13:
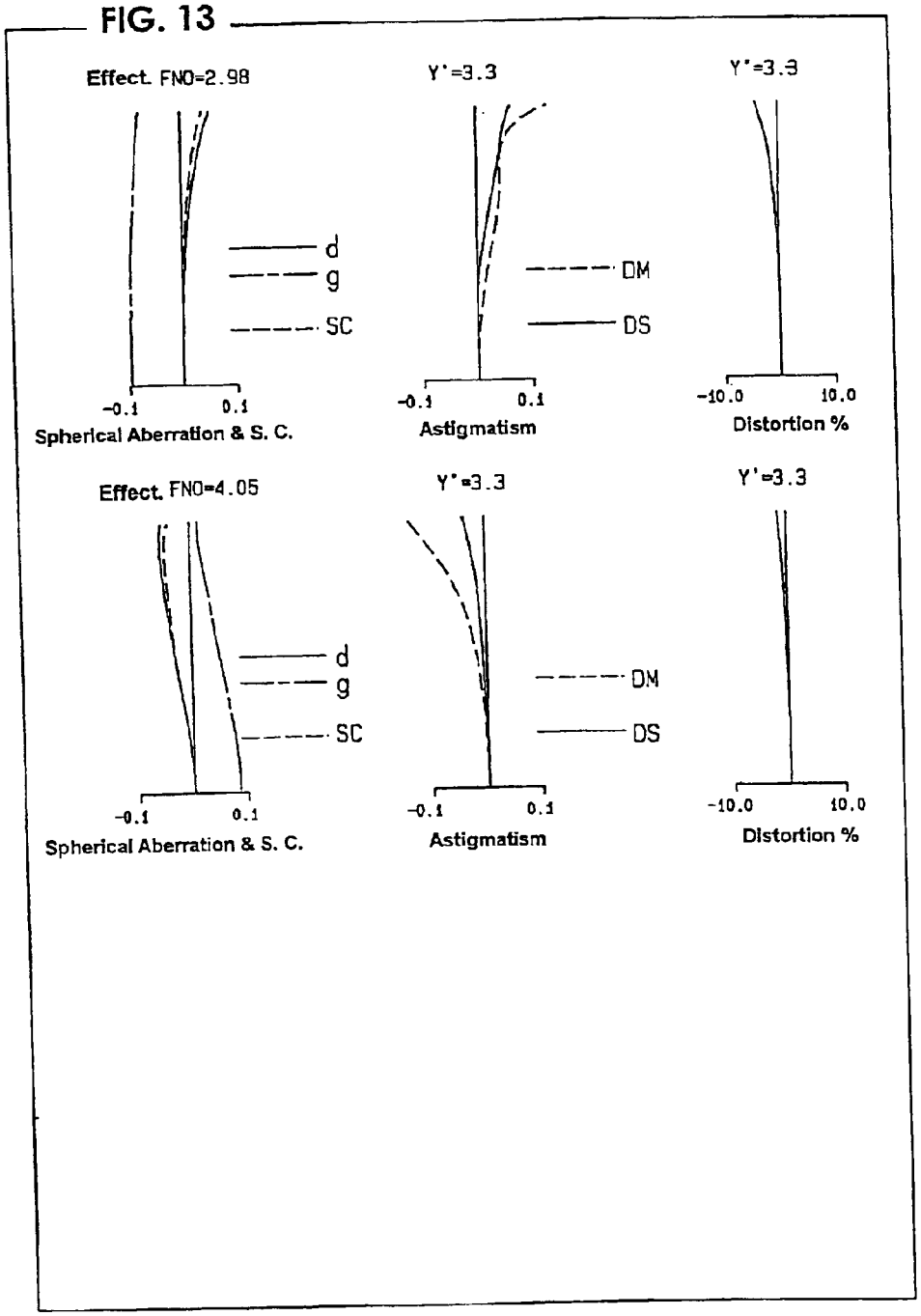
FIG. 13 is graphic representations of aberrations of the third embodiment in in-focus state at finite distance.
Figure 14:
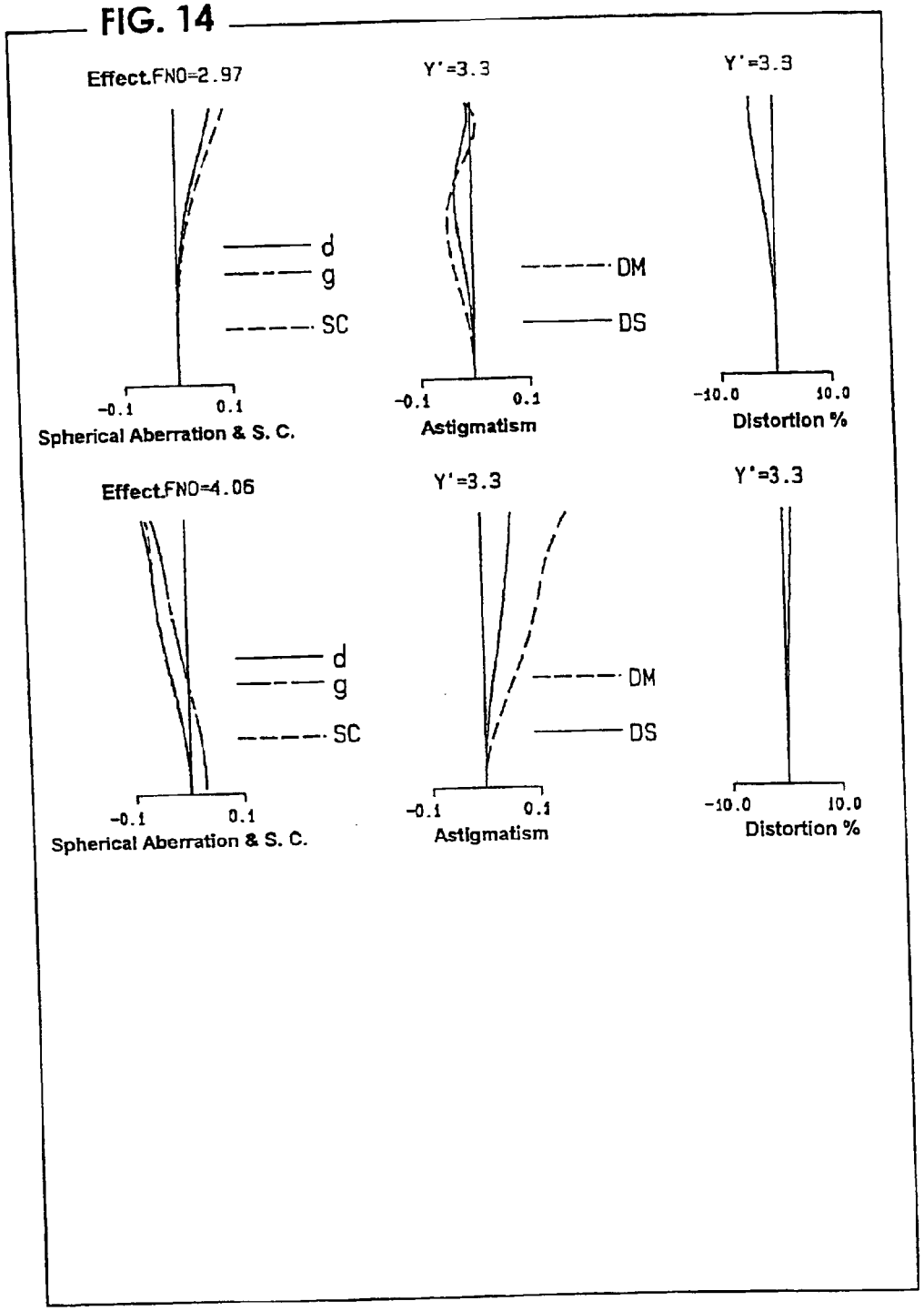
FIG. 14 is graphic representations of aberrations of the fourth embodiment in in-focus state at finite distance.
Figure 15:
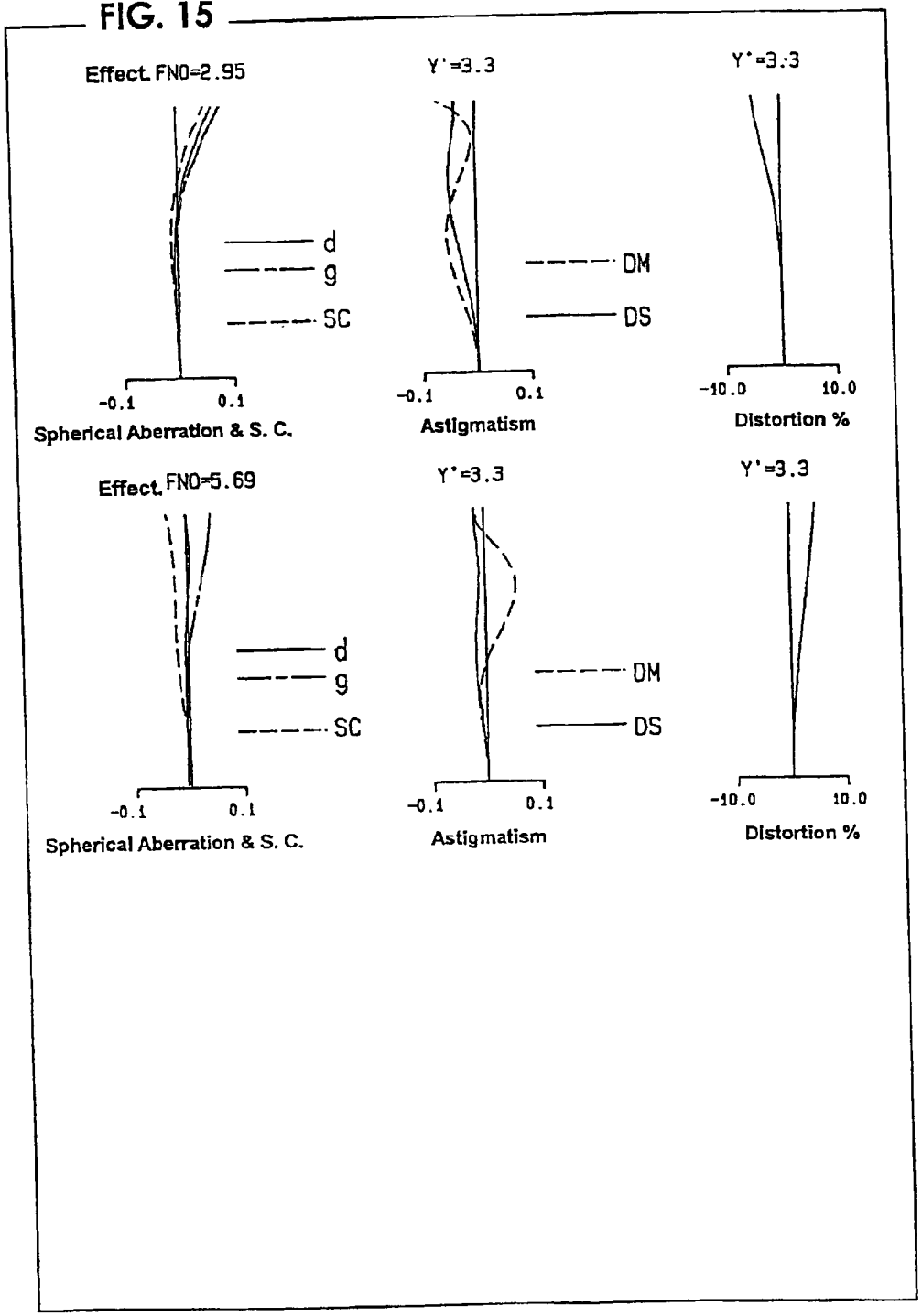
FIG. 15 is graphic representations of aberrations of the fifth embodiment in in-focus state at finite distance.

FIG. 5 shows the lens arrangement of a zoom lens system of a fifth embodiment. This zoom lens system comprises from the object side: a first lens unit Gr1 including only a first lens element L1 of a bi-concave configuration; a second lens unit Gr2 including a second lens element L2 of a bi-convex configuration, a third lens element L3 of a bi-concave configuration, a diaphragm ST and a fourth lens element L4 of a bi-convex configuration; and a third lens unit Gr3 including a fifth lens element L5 of a negative meniscus configuration convex to the object side and a sixth lens element L6 of a positive meniscus configuration convex to the object side. In zooming from the shortest focal length condition to the longest focal length condition, the first lens unit Gr1 moves so as to draw a locus of a U-turn convex to the image side, the second lens unit Gr2 monotonously moves toward the object side, and the third lens unit Gr3 is stationary with respect to the image surface. In focusing from the infinity in-focus state to the finite object in-focus state, the fourth lens element L4 alone is moved toward the object side.

The zoom lens systems of these embodiments have the first lens unit disposed on the most object side and including only one negative lens element. In zoom lens systems in which the first lens unit has a negative optical power, normally, the lens diameter of the first lens unit in the direction vertical to the optical axis is the largest to secure the f-number. When the first lens unit includes a plurality of lens elements, the effective diameter of the first lens element necessarily increases to secure the light ray incident on the zoom lens system. Therefore, to reduce the outside diameter, it is desirable that the first lens unit include one, which is the minimum number, lens element. Moreover, when a lens element having a large diameter has a curvature, the axial air distance between the lens elements increases accordingly. That is, the number of lens elements of the first lens unit is an important element that increases the overall length of the zoom lens system. In the zoom lens systems of the embodiments, since the negative lens unit includes one, which is the minimum number, lens element, the overall length of the zoom lens system can be shortened and the thickness in a condition where the zoom lens system is housed (hereinafter, referred to as collapsed condition) can be reduced.

It is desirable that in zooming, the first lens unit move so as to draw a locus convex to the image side like in the zoom lens systems of the embodiments. By the first lens unit moving in this manner, the curvature of field in the middle focal length condition can be excellently corrected.

Moreover, in the zoom lens systems of the embodiments, the diaphragm is disposed on the object or the image side of the second lens unit, or in the second lens unit. When the diaphragm is disposed on the image side of these positions, the outside diameter of the first lens unit are too large, so that a compact zoom lens system cannot be attained.

Moreover, in the zoom lens systems of the embodiments, focusing is performed by moving along the optical axis a positive lens unit or a single lens element disposed in a position on the image side of the diaphragm and not included in the most image side lens unit. By the focusing lens unit being the positive lens unit or the single lens element disposed in the position on the image side of the diaphragm and not included in the most image side lens unit, a lens unit or a single lens element being light in weight and whose movement amount during focusing is small is moved for focusing, so that effects are produced on the lens barrel structure and reduction in the load on the driving motor.

The zoom lens systems of the embodiments include the second lens unit being overall positive and including a positive lens element and a negative lens element that are independent of each other. In minus lead zoom lens systems, the negative optical power of the second lens unit most contributes to zooming. Therefore, variation in aberrations, particularly axial chromatic aberration, caused in the second lens unit due to zooming is large. To correct this, unless the second lens unit at least includes a positive lens element and a negative lens element that are independent of each other, it is impossible to balance the axial chromatic aberration in the entire zoom range.

Moreover, the zoom lens systems satisfy the following conditions:

$$Fnt \leq 6.0 \tag{1}$$

$$2.3 \leq ft/fw \leq 5.5 \tag{2}$$

where Fnt is the minimum f-number of the zoom lens system in the longest focal length condition, fw is the focal length of the zoom lens system in the shortest focal length condition, and ft is the focal length of the zoom lens system in the longest focal length condition.

The condition (1) defines the minimum f-number of the zoom lens system in the longest focal length condition. When the minimum f-number exceeds 6.0, it is impossible to maintain image quality equivalent to that of film-based cameras. In particular, when the f-number exceeds 6.0, it is difficult to obtain moving images.

The condition (2) defines the zoom ratio of the zoom lens system. This condition (2) is defined because the zoom lens system intended by the present invention is a compact zoom lens system whose main target magnification is 3× to 4×. When the zoom ratio is lower than the lower limit of the condition (2), the significance of optical zooming is low, so that user benefit cannot be attained. When the zoom ratio is higher than the upper limit of the condition (2), the overall length is too large particularly in the longest focal length condition, so that it is difficult to attain size reduction as a zoom lens device. It is more desirable that the zoom lens systems have a zoom ratio satisfying the following range:

$$3.1 \leq ft/fw \quad (2)'$$

Moreover, the zoom lens systems of the embodiments satisfy the following condition (3):

$$0.1 < T23w/fw < 1.5 \quad (3)$$

where T23w is the axial distance between the second lens unit (most image side) and the adjoining lens unit on the image side (most object side) in the shortest focal length condition, and fw is the focal length of the zoom lens system in the shortest focal length condition.

The condition (3) defines the axial distance between the second lens unit and the adjoining lens unit on the image side in the zoom lens system. When the lower limit of the condition (3) is exceeded, the possibility is high that interference such that the lens elements of the second and the third lens units come into contact with each other occurs in the shortest focal length condition, so that it is difficult to structure the lens barrel. When the upper limit of the condition (3) is exceeded, the overall length in the direction of the optical axis is large in the shortest focal length condition, so that it is impossible to attain a compact zoom lens system. Moreover, when the upper limit is exceeded, because of the power arrangement, the distance between the first lens unit and the image surface is large and the overall length in the direction of the optical axis is large accordingly, and to secure illuminance on the image surface, the diameter of the lens element constituting the first lens unit is large, so that it is impossible to attain a compact zoom lens system.

The zoom lens systems of the embodiments satisfy the following condition (4):

$$0.6 < Tsum/fw < 2.6 \quad (4)$$

where Tsum is the sum of the axial thicknesses of all the lens elements included in the zoom lens system; and fw is the foal length of the zoom lens system in the shortest focal length condition.

The condition (4) defines the sum of the axial thicknesses of all the lens elements included in the zoom lens system. The size of the zoom lens system in the direction of the optical axis in the collapsed condition is the greatest factor that substantially decides the size of the digital camera and the portable information apparatus in the direction of the thickness. The size in the direction of the optical axis in the collapsed condition cannot be physically smaller than the sum of the axial thicknesses of the lens elements. Therefore, unless Tsum can be reduced, a zoom lens system that is compact in the collapsed condition cannot be attained. The condition (4) is just a condition that defines the thickness in the collapsed condition. When the lower limit of the condition (4) is exceeded, it is physically difficult to structure the optical system. When the upper limit thereof is exceeded, the lens thickness is too large and exceeds the limit permitted in digital cameras and portable information apparatuses. It is more effective that the range of the condition (4) is as follows:

$$Tsum/fw < 2.2 \quad (4)'$$

$$Tsum/fw < 2.0 \quad (4)''$$

It is desirable to satisfy the conditions (3) and (4) at the same time because by doing so, the zoom lens system can be more effectively structured while the effects of the conditions are produced.

The zoom lens systems of the embodiments satisfy the following condition (5):

$$v1 > 45 \quad (5)$$

where v1 is the Abbe number of the single negative lens element constituting the first lens unit.

The condition (5) defines the Abbe number of the negative lens element constituting the first lens unit. In zoom lens systems, normally, a certain extent of aberration correction is performed in each lens unit to minimize variation in aberrations caused during zooming. However, since the first lens unit is constituted by one negative lens element, correction of aberrations, particularly axial chromatic aberration, in lens units is extremely difficult. Therefore, in the zoom lens systems of the embodiments, it is necessary to balance the aberrations by canceling the axial chromatic aberration generated in the first lens unit by another lens unit. However, it is undesirable to form the negative lens element of the first lens unit of a material having an Abbe number exceeding the upper limit of the condition (5) because when this is done, variation in axial chromatic aberration exceeds the permissible range that can be corrected by another lens unit.

It is more desirable that the condition (5)', further the condition (5)'' be satisfied:

$$v1 > 60 \quad (5)'$$

$$v1 > 80 \quad (5)''$$

Moreover, it is desirable to use a material having anomalous dispersibility for the negative lens element constituting the first lens unit because by doing so, further chromatic aberration correction can be attained. Moreover, since it is desirable that the negative lens element constituting the first lens unit have an aspherical configuration for the purpose of distortion correction and the like, the negative lens element may be a resin lens element, satisfying the condition (5), where it is easy to form an aspherical surface.

Moreover, in the zoom lens systems of the embodiments, it is desirable that the most image side lens unit be overall positive and include a positive lens element and a negative lens element. With this structure, variation in axial chromatic aberration caused due to zooming, particularly, in the single negative lens element of the first lens unit can be excellently corrected. In addition, this structure is also effective in correcting off-axial coma aberration, particularly, in the shortest focal length condition. Further, by the most image side lens unit being stationary with respect to the image surface, variation in axial chromatic aberration due to zooming can be more excellently corrected, and the lens barrel structure can be simplified.

While the lens units of the first to the fifth embodiments comprise only refractive type lens elements that deflect the incident ray by refraction, the present invention is not limited thereto. For example, the lens units may comprise diffractive type lens elements that deflect the incident ray by diffraction, refractive-diffractive hybrid lens elements that deflect the incident ray by a combination of diffraction and refraction, or the like.

The construction of zoom lens systems embodying the present invention will be more concretely described with reference to construction data, graphic representations of aberrations and the like. A first to fifth example shown below corresponds to the above-described first to fifth embodiments, respectively. FIGS. 1 to 5 showing the lens arrangements of the first to the fifth embodiments show the lens arrangements of the corresponding first to fifth examples.

In the construction data of the examples, ri (i=1,2,3, . . . ) is the radius of curvature of the i-th surface counted from the object side, di (i=1,2,3, . . . ) is the i-th axial distance counted from the object side, and Ni (i=1,2,3, . . . ) and νi (i=1,2,3, . . .) are the refractive index (Nd) and the Abbe number (νd), to the d-line, of the i-th optical element counted from the object side. In the construction data, the axial distances that vary during zooming (variable distances) are axial air distances between the lens units in the shortest focal length condition (short focal length side end) [W], in the middle (middle focal length condition) [M] and in the longest focal length condition (long focal length side end) [T]. The overall focal lengths f and the f-numbers FNO in the focal length conditions [W], [M] and [T] are shown together with other data.

When the symbol * is added to ri which is the symbol for the radius of curvature, this surface is an aspheric surface whose shape is defined by the following formula (AS). Aspheric surface data according to the respective examples are shown together with other data.

$$x = \frac{C_0 y^2}{1 + \sqrt{1 - \varepsilon C_0^2 y^2}} + \sum A_i y^i \quad (AS)$$

where, x represents the shape (mm) of the aspherical surface (i.e., the displacement along the optical axis at the height y in a direction perpendicular to the optical axis of the aspherical surface), Co represents the curvature ($mm^{-1}$) of the reference aspherical surface of the aspherical surface, y represents the height in a direction perpendicular to the optical axis, ε represents the quadric surface parameter, and Ai represents the aspherical coefficient of order i.

EXAMPLE 1

| | f = 6.0–13.8–17.3 mm FNo. = 2.95–4.08–4.58 | | |
|---|---|---|---|
| [Radius of Curvature] | [Axial Distance] | [Refractive Index (nd)] | [Abbe Number (vd)] |
| r1* = −24.000 | d1 = 1.200 | N1 = 1.52510 | v1 = 56.38 |

-continued

| | f = 6.0–13.8–17.3 mm FNo. = 2.95–4.08–4.58 | | |
|---|---|---|---|
| r2* = 8.537 | d2 = 21.597–5.154–2.607 | | |
| r3 = 8.946 | d3 = 2.620 | N2 = 1.75450 | v2 = 51.57 |
| r4 = −28.455 | d4 = 1.880 | | |
| r5* = −14.577 | d5 = 0.800 | N3 = 1.84666 | v3 = 23.82 |
| r6* = 155.719 | d6 = 0.800 | | |
| r7 = ∞ | d7 = 7.471 | | |
| r8 = 21.530 | d8 = 1.721 | N4 = 1.79260 | v4 = 45.91 |
| r9 = −31.317 | d9 = 1.000–10.165–14.254 | | |
| r10 = 65.851 | d10 = 0.800 | N5 = 1.79850 | v5 = 22.60 |
| r11 = 6.992 | d11 = 0.100 | | |
| r12 = 6.038 | d12 = 2.772 | N6 = 1.52510 | v6 = 56.38 |
| r13* = −37.830 | d13 = 2.240 | | |
| r14 = ∞ | d14 = 2.000 | N7 = 1.51680 | v7 = 64.20 |
| r15 = ∞ | | | |

[Aspherical Coefficient]

r1

ε = 0.10000E+01
A4 = −0.37244E−03
A6 = 0.15081E−04
A8 = −0.18789E−06
A10 = 0.65368E−09 r2

ε = 0.10000E+01
A4 = −0.71541E−03
A6 = 0.76630E−05
A8 = 0.41941E−06
A10 = −0.10107E−07 r5

ε = 0.10000E+01
A4 = 0.33144E−03
A6 = 0.47309E−04
A8 = −0.10852E−04
A10 = 0.67862E−06 r6

ε = 0.10000E+01
A4 = 0.71541E−03
A6 = 0.64576E−04
A8 = −0.12229E−04
A10 = 0.74861E−06 r13

ε = 0.10000E+01
A4 = 0.11793E−02
A6 = 0.96628E−05
A8 = 0.32872E−06
A10 = 0.45109E−09

EXAMPLE 2

| | f = 5.6–12.9–16.1 mm FNo. = 2.95–4.01–4.45 | | |
|---|---|---|---|
| [Radius of Curvature] | [Axial Distance] | [Refractive Index (nd)] | [Abbe Number (vd)] |
| r1* = −24.000 | d1 = 1.200 | N1 = 1.49310 | v1 = 83.58 |
| r2* = 8.123 | d2 = 20.351–5.732–3.353 | | |
| r3 = 6.991 | d3 = 2.638 | N2 = 1.72375 | v2 = 52.66 |
| r4 = −34.740 | d4 = 0.900 | | |
| r5 = ∞ | d5 = 1.000 | | |
| r6* = −9.988 | d6 = 0.800 | N3 = 1.84666 | v3 = 23.82 |
| r7* = 247.216 | d7 = 6.049–6.611–6.879 | | |
| r8 = 16.911 | d8 = 1.806 | N4 = 1.77436 | v4 = 48.39 |
| r9 = −46.007 | d9 = 0.800–9.345–13.337 | | |
| r10 = 9.008 | d10 = 0.800 | N5 = 1.84666 | v5 = 23.82 |
| r11 = 4.749 | d11 = 0.301 | | |
| r12* = 5.048 | d12 = 3.555 | N6 = 1.52510 | v6 = 56.38 |
| r13* = 21.908 | d13 = 0.800 | | |

-continued f = 5.6–12.9–16.1 mm FNo. = 2.95–4.01–4.45

| | | | |
|---|---|---|---|
| r14 = ∞ | d14 = 2.000 | N7 = 1.51680 | ν7 = 64.20 |
| r15 = ∞ | | | |

[Aspherical Coefficient]
r1

ε = 0.10000E+01
A4 = −0.63439E−04
A6 = 0.68501E−05
A8 = −0.66696E−07
A10 = −0.17038E−09
r2

ε = 0.10000E+01
A4 = −0.47028E−03
A6 = 0.69477E−06
A8 = 0.66535E−06
A10 = −0.15800E−07
r6

ε = 0.10000E+01
A4 = 0.59417E−03
A6 = 0.46685E−04
A8 = −0.77214E−05
A10 = 0.39203E−06
r7

ε = 0.10000E+01
A4 = 0.12314E−02
A6 = 0.80651E−04
A8 = −0.10222E−04
A10 = 0.55470E−06
r12

ε = 0.10000E+01
A4 = −0.59528E−03
A6 = −0.10325E−04
A8 = −0.14170E−06
A10 = −0.31345E−06
r13

ε = 0.10000E+01
A4 = −0.55636E−03
A6 = 0.13842E−03
A8 = −0.20578E−04
A10 = 0.36116E−06

EXAMPLE 3 f = 6.0–12.0–17.3 mm FNo. = 2.95–3.60–3.84

| [Radius of Curvature] | [Axial Distance] | [Refractive Index (nd)] | [Abbe Number (νd)] |
|---|---|---|---|
| r1* = 72.689 | d1 = 1.200 | N1 = 1.49310 | ν1 = 83.58 |
| r2* = 8.018 | d2 = 28.005–8.738–1.125 | | |
| r3 = 5.404 | d3 = 2.577 | N2 = 1.70206 | ν2 = 53.53 |
| r4 = −4231.909 | d4 = 0.900 | | |
| r5 = ∞ | d5 = 1.271 | | |
| r6* = −10.108 | d6 = 0.800 | N3 = 1.84666 | ν3 = 23.82 |
| r7* = 19.972 | d7 = 4.900–5.414–4.248 | | |
| r8 = 12.483 | d8 = 2.589 | N4 = 1.69005 | ν4 = 54.04 |
| r9 = −18.055 | d9 = 0.800–2.578–8.087 | | |
| r10* = 7.794 | d10 = 1.157 | N5 = 1.80518 | ν5 = 25.43 |
| r11* = 5.486 | d11 = 0.800–2.807–1.046 | | |
| r12 = ∞ | d12 = 2.000 | N6 = 1.51680 | ν6 = 64.20 |
| r13 = ∞ | | | |

[Aspherical Coefficient]
r1

ε = 0.10000E+01

A4 = −0.15783E−03
A6 = 0.29784E−05
A8 = −0.83049E−07
A10 = 0.69898E−09
r2

ε = 0.10000E+01
A4 = −0.37748E−03
A6 = 0.46708E−05
A8 = −0.33213E−06
A10 = 0.30433E−08
r6

ε = 0.10000E+01
A4 = −0.36757E−02
A6 = 0.36847E−03
A8 = −0.10565E−04
A10 = −0.20504E−05
r7

ε = 0.10000E+01
A4 = −0.21103E−02
A6 = 0.46641E−03
A8 = −0.26240E−04
r10

ε = 0.10000E+01
A4 = −0.57224E−02
A6 = −0.62282E−05
A8 = 0.46111E−05
A10 = −0.39249E−06
r11

ε = 0.10000E+01
A4 = −0.81522E−02
A6 = 0.16684E−03
A8 = −0.53316E−05

EXAMPLE 4 f = 6.0–10.8–17.3 mm FNo. = 2.95–3.46–4.24

| [Radius of Curvature] | [Axial Distance] | [Refractive Index (nd)] | [Abbe Number (νd)] |
|---|---|---|---|
| r1* = −180.565 | d1 = 1.000 | N1 = 1.49310 | ν1 = 83.58 |
| r2* = 8.101 | d2 = 22.102–8.977–3.301 | | |
| r3 = ∞ | d3 = 0.600 | | |
| r4 = 6.286 | d4 = 2.725 | N2 = 1.74159 | ν2 = 43.17 |
| r5 = −29.861 | d5 = 1.300 | | |
| r6* = −11.145 | d6 = 1.000 | N3 = 1.84666 | ν3 = 23.82 |
| r7* = 10.004 | d7 = 3.742–4.916–4.596 | | |
| r8 = 21.104 | d8 = 2.414 | N4 = 1.80513 | ν4 = 44.41 |
| r9 = −20.523 | d9 = 1.000–6.985–16.317 | | |
| r10 = 10.089 | d10 = 3.566 | N5 = 1.48749 | ν5 = 70.44 |
| r11 = −8.086 | d11 = 0.100 | | |
| r12 = −7.873 | d12 = 0.800 | N6 = 1.58340 | ν6 = 30.23 |
| r13* = 25.439 | d13 = 2.550–2.460–1.116 | | |
| r14 = ∞ | d14 = 2.000 | N7 = 1.51633 | ν7 = 64.14 |
| r15 = ∞ | | | |

[Aspherical Coefficient]
r1

ε = 0.10000E+01
A4 = −0.75826E−03
A6 = 0.34105E−04
A8 = −0.50991E−06
A10 = 0.25871E−08
r2

ε = 0.10000E+01

-continued f = 6.0–10.8–17.3 mm FNo. = 2.95–3.46–4.24

A4 = −0.10941E−02
A6 = 0.26338E−04
A8 = 0.51284E−06
A10 = −0.16952E−07
r6

ϵ = 0.10000E+01
A4 = −0.31416E−03
A6 = 0.93704E−05
A8 = 0.43331E−05
A10 = −0.34297E−06
r7

ϵ = 0.10000E+01
A4 = 0.55006E−03
A6 = 0.43702E−04
A8 = 0.29782E−05
A10 = −0.26895E−06
r13

ϵ = 0.10000E+01
A4 = 0.55321E−03
A6 = −0.23535E−04
A8 = 0.11220E−05
A10 = −0.93429E−08

EXAMPLE 5 f = 5.6–16.1–21.2 mm FNo. = 2.95–4.51–5.27

| [Radius of Curvature] | [Axial Distance] | [Refractive Index (nd)] | [Abbe Number (vd)] |
|---|---|---|---|
| r1* = −39.852 | d1 = 1.200 | N1 = 1.49310 | v1 = 83.58 |
| r2* = 7.943 | d2 = 27.324–5.086–2.210 | | |
| r3 = 9.089 | d3 = 2.617 | N2 = 1.75450 | v2 = 51.57 |
| r4 = −26.827 | d4 = 1.220 | | |
| r5* = −45.076 | d5 = 0.800 | N3 = 1.84666 | v3 = 23.82 |
| r6* = 18.718 | d6 = 1.188 | | |
| r7 = ∞ | d7 = 8.466 | | |
| r8 = 19.274 | d8 = 1.710 | N4 = 1.76213 | v4 = 50.28 |
| r9 = −79.564 | d9 = 1.000–13.487–19.631 | | |
| r10 = 19.602 | d10 = 0.800 | N5 = 1.79850 | v5 = 22.60 |
| r11 = 6.499 | d11 = 0.100 | | |
| r12* = 5.624 | d12 = 3.076 | N6 = 1.52510 | v6 = 56.38 |
| r13* = 67.250 | d13 = 1.000 | | |
| r14 = ∞ | d14 = 2.000 | N7 = 1.51680 | v7 = 64.20 |
| r15 = ∞ | | | |

[Aspherical Coefficient]
r1

ϵ = 0.10000E+01
A4 = −0.64385E−03
A6 = 0.20445E−04
A8 = −0.22702E−06
A10 = 0.79381E−09
r2

ϵ = 0.10000E+01
A4 = −0.10137E−02
A6 = 0.90231E−05
A8 = 0.49260E−06
A10 = −0.10596E−07
r5

ϵ = 0.10000E+01
A4 = −0.61443E−03
A6 = 0.40451E−04
A8 = −0.38476E−05
A10 = 0.18991E−06
r6

-continued f = 5.6–16.1–21.2 mm FNo. = 2.95–4.51–5.27

ϵ = 0.10000E+01
A4 = −0.28745E−03
A6 = 0.58066E−04
A8 = −0.54298E−05
A10 = 0.27306E−06
r12

ϵ = 0.10000E+01
A4 = 0.65072E−03
A6 = −0.30424E−03
A8 = 0.28044E−04
A10 = −0.12221E−05
r13

ϵ = 0.10000E+01
A4= 0.27656E−02
A6 = −0.45141E−03
A8 = 0.33907E−04
A10 = −0.12549E−05

FIGS. 6 through 10 are aberration diagrams of the first through the fifth examples, each showing aberrations when the zoom lens system according to each example is an infinite focus state. Shown in FIGS. 6 through 10 are aberrations in the shortest focal length state, the intermediate focal length state, the longest focal length state from the top.

FIGS. 11 through 15 are aberration diagrams of the first through the fifth examples, each showing aberrations when the zoom lens system according to each example is an finite focus state (object distance=0.4 m). Shown in FIGS. 11 through 15 are aberrations in the shortest focal length state, the maximum focal length state from the top.

In FIGS. 6 through 15, shown from the left hand side are spherical aberrations or the like, astigmatisms and distortion aberrations, and Y' (mm) denotes a maximum image height (which corresponds to a distance from the optical axis) on the imaging sensor.

In the spherical aberration diagrams, the solid line (d) represents spherical aberrations to the d-line, the dashed line (g) represents spherical aberrations to the g-line, and the broken line (SC) represents the level of dissatisfaction of the sine condition. In the astigmatism diagrams, the broken line (DM) represents astigmatisms at a meriodional surface and the solid line (DS) represents astigmatisms at a sagital surface. In the distortion aberration diagrams, the solid line represents a distortion % to the d-line.

As described above, according to the zoom lens device of the present invention, a zoom lens device can be provided that is provided with a zoom lens system whose length in the direction of the optical axis in the collapsed condition is sufficiently short although the zoom ratio is high.

Moreover, according to the zoom lens device of the present invention, a zoom lens device can be provided that is provided with a zoom lens system that is bright even in the longest focal length condition and whose length in the direction of the optical axis in the collapsed condition is sufficiently short.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens device comprising:
a zoom lens system having a plurality of lens units; and
an image sensor for converting an optical image formed by the zoom lens system, into electric image data,
the zoom lens system comprising:
a first lens unit disposed on the most object side and consisting of a single negative lens element;
a second lens unit having a positive optical power; and
a diaphragm disposed on the object or the image side of the second lens unit, or in the second lens unit;
wherein zooming is performed by varying the distances between the lens units, and
wherein focus adjustment by varying the object distance is performed by moving along the optical axis a positive lens unit or a single lens element disposed in a position on the image side of the diaphragm and not included in the most image side lens unit.

2. A zoom lens system as claimed in claim 1, wherein the zoom lens system satisfies the following conditions:

$$Fnt \leq 6.0$$

$$2.3 \leq fw/ft \leq 5.5$$

where Fnt is the minimum f-number of the zoom lens system in the longest focal length condition, fw is the focal length of the zoom lens system in the shortest focal length condition, and ft is the focal length of the zoom lens system in the longest focal length condition.

3. A zoom lens system as claimed in claim 1, wherein the zoom lens system satisfies the following condition:

$$0.1 < T23w/fw < 1.5$$

where T23w is the axial distance between the most image side of said second lens unit and the most object side of an adjoining lens unit on the image side in the shortest focal length condition, and fw is the focal length of the zoom lens system in the shortest focal length condition.

4. A zoom lens system as claimed in claim 1, wherein the zoom lens system satisfies the following condition:

$$0.6 < Tsum/fw < 2.6$$

where Tsum is the sum of the axial thicknesses of all the lens elements included in the zoom lens system; and fw is the focal length of the zoom lens system in the shortest focal length condition.

5. A zoom lens system as claimed in claim 1, wherein the zoom lens system satisfies the following condition:

$$v1 > 45$$

where v1 is the Abbe number of the single negative lens element constituting the first lens unit.

6. A zoom lens device as claimed in claim 1, wherein the first lens unit moves so as to draw a locus of a U-turn convex to the image side in zooming from the shortest focal length condition to the longest focal length condition.

7. A zoom lens device as claimed in claim 1, wherein the first lens unit includes at least one aspherical surface.

8. A zoom lens device as claimed in claim 1, wherein the focusing is performed by moving along the optical axis either a positive lens unit or a single lens element disposed in a position on the image side of a diaphragm and not included in the most image side lens unit.

9. A zoom lens device as claimed in claim 1, wherein the zoom lens system comprises, from the object side:
the first lens unit;
the second lens unit; and
a third lens unit having a positive optical power.

10. A zoom lens device as claimed in claim 1, wherein the zoom lens system comprises, from the object side:
the first lens unit;
the second lens unit;
a third lens unit having a positive optical power; and
a fourth lens unit having a positive optical power.

11. A digital camera comprising:
a zoom lens device including a zoom lens system and an image sensor;
the image sensor for converting an optical image formed by the zoom lens system into electric image data, and
the zoom lens system having a plurality of lens units and comprising:
a first lens unit disposed on the most object side and consisting of a single negative lens element;
a second lens unit having a positive optical power; and
a diaphragm disposed on the object or the image side of the second lens unit, or in the second lens unit;
wherein zooming is performed by varying the distances between the lens units, and
wherein focus adjustment by varying the object distance is performed by moving along the optical axis a positive lens unit or a single lens element disposed in a position on the image side of the diaphragm and not included in the most image side lens unit.

12. A zoom lens device comprising:
an image sensor for converting an optical image formed by a lens system into electric image data; and
a zoom lens system having a plurality of lens units,
said zoom lens system comprising:
a first lens unit disposed on the most object side and consisting of a single negative lens element;
a second lens unit having a positive optical power;
a diaphragm disposed on the object or the image side of the second lens unit, or in the second lens unit; and
a focus adjustment lens unit comprising a positive lens unit or a single lens element disposed in a position on the image side of the diaphragm and not included in the most image side lens unit;
wherein zooming is performed by varying the distances between the lens units, and
wherein focus adjustment by varying the object distance is performed by moving said focus adjustment lens unit along the optical axis.

13. A zoom lens system as claimed in claim 12, wherein said focus adjustment lens unit comprises said second lens unit.

14. A zoom lens system as claimed in claim 12, wherein said focus adjustment lens unit comprises a separately adjustable part of said second lens unit.

15. A zoom lens system as claimed in claim 12, wherein said focus adjustment lens unit is a single lens element.

16. A zoom lens system as claimed in claim 15, wherein said single lens element is a separately adjustable part of said second lens unit.

17. A zoom lens device comprising:
an image sensor for converting an optical image formed by a lens system into electric image data; and a zoom lens system having a plurality of lens units, said zoom lens system comprising, a first lens unit disposed on the most object side and consisting of a single negative lens element;

a second lens unit having a positive optical power;

a diaphragm disposed on the object or the image side of the second lens unit, or in the second lens unit; and a focus adjustment lens unit comprising a positive lens unit or a single lens element disposed in a position on the image side of the diaphragm and not included in the most image side lens unit, such that when adjusting focus all lens elements not constituting said focus adjustment lens unit retain their positions respective to one another, and said focus adjustment lens unit moves along the optical axis of said zoom lens system;

wherein zooming is performed by varying the distances between the lens units.

18. A digital camera having a zoom lens device comprising:

an image sensor for converting an optical image formed by a lens system into electric image data; and a zoom lens system having a plurality of lens units, said zoom lens system comprising, a first lens unit disposed on the most object side and consisting of a single negative lens element;

a second lens unit having a positive optical power;

a diaphragm disposed on the object or the image side of the second lens unit, or in the second lens unit; and a focus adjustment lens unit comprising a positive lens unit or a single lens element disposed in a position on the image side of the diaphragm and not included in the most image side lens unit;

wherein zooming is performed by varying the distances between the lens units, and wherein focus adjustment by varying the object distance is performed by moving said focus adjustment lens unit along the optical axis.

19. A digital camera having a zoom lens device comprising:

an image sensor for converting an optical image formed by a lens system into electric image data; and a zoom lens system having a plurality of lens units, said zoom lens system comprising, a first lens unit disposed on the most object side and consisting of a single negative lens element;

a second lens unit having a positive optical power;

a diaphragm disposed on the object or the image side of the second lens unit, or in the second lens unit; and a focus adjustment lens unit comprising a positive lens unit or a single lens element disposed in a position on the image side of the diaphragm and not included in the most image side lens unit, such that when adjusting focus all lens elements not constituting said focus adjustment lens unit retain their positions respective to one another, and said focus adjustment lens unit moves along the optical axis of said zoom lens system;

wherein zooming is performed by varying the distances between the lens units.

* * * * *

UNITED STATES PATENT AND TRADEMARK OFFICE
CERTIFICATE OF CORRECTION

PATENT NO. : 6,930,839 B2
DATED : August 16, 2005
INVENTOR(S) : Hitoshi Hagimori, Genta Yagyu and Kazuhiko Ishimaru It is certified that error appears in the above-identified patent and that said Letters Patent is hereby corrected as shown below:

<u>Column 15,</u>
Line 25, delete "$2.3 \leq fw/ft \leq 5.5$" and insert -- $2.3 \leq ft/fw \leq 5.5$ --.

Signed and Sealed this

Fourth Day of October, 2005

JON W. DUDAS
*Director of the United States Patent and Trademark Office*